(12) United States Patent
Schreck et al.

(10) Patent No.: US 6,266,205 B1
(45) Date of Patent: Jul. 24, 2001

(54) PARALLEL SERVO WITH ULTRA HIGH BANDWIDTH OFF-TRACK DETECTION

(75) Inventors: Erhard T. Schreck, San Jose; Lin Guo, Milpitas, both of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/073,600

(22) Filed: May 6, 1998

Related U.S. Application Data

(63) Continuation-in-part of application No. 09/037,938, filed on Mar. 10, 1998, now Pat. No. 6,157,510.

(51) Int. Cl.$^7$ .................................................. G11B 5/596
(52) U.S. Cl. ........................... 360/77.06; 360/77.02; 360/77.08; 360/78.05
(58) Field of Search .................... 360/77.08, 77.06, 360/77.02, 77.05, 77.11, 78.05

(56) References Cited

U.S. PATENT DOCUMENTS

| 3,246,307 | 4/1966 | Stanley . | |
|---|---|---|---|
| 3,860,965 | 1/1975 | Voegeli | 360/113 |
| 3,918,091 | 11/1975 | Walraven et al. | 360/77 |
| 4,012,781 | 3/1977 | Lin | 360/113 |
| 4,056,830 | * 11/1977 | Smith | 360/51 |
| 4,115,823 | 9/1978 | Commander et al. | 360/77 |
| 4,377,827 | 3/1983 | Rose | 360/78 |
| 4,701,815 | * 10/1987 | Yada et al. | 360/77.06 |
| 4,757,410 | 7/1988 | Seko et al. | 360/113 |
| 4,953,161 | 8/1990 | Toyama | 360/77.12 |
| 5,079,663 | 1/1992 | Ju et al. | 360/113 |
| 5,107,385 | 4/1992 | Kelley | 360/113 |
| 5,257,148 | 10/1993 | Solhjell et al. | 360/77.06 |
| 5,262,908 | 11/1993 | Iwamatsu et al. | 360/77.12 |
| 5,388,014 | * 2/1995 | Brug et al. | 360/66 |
| 5,420,736 | 5/1995 | Heim et al. | 360/113 |
| 5,506,687 | 4/1996 | Gillard et al. | 358/310 |
| 5,596,458 | * 1/1997 | Emo et al. | 360/48 |
| 5,754,354 | 5/1998 | Tomita et al. | 360/61 |
| 5,999,378 | 12/1999 | Saito et al. | 360/113 |
| 6,018,430 | * 1/2000 | Ho et al. | 360/48 |
| 6,052,251 | * 4/2000 | Mohajerani et al. | 360/78.05 |

FOREIGN PATENT DOCUMENTS 1 470 735 4/1977 (GB) .

* cited by examiner

*Primary Examiner*—David Hudspeth
*Assistant Examiner*—Dan I. Davidson
(74) *Attorney, Agent, or Firm*—David M. Sigmond

(57) ABSTRACT

A magnetic storage system having one or more rotating disks is disclosed. In a preferred embodiment, each rotating disk has two magnetic surfaces which each contain a number of tracks. Each track has one or more data regions and one or more embedded servo sectors. First and second transducers are respectively suspended over first and second tracks corresponding to first and second magnetic surfaces. The second transducer determines an off-track position with respect to the second track by reading from the data region of the second track. Once the off-track position is determined for the second transducer, that information is used to position the first transducer with respect to the first track and position the second transducer with respect to the second track as the first transducer writes to the first track. Furthermore, the first transducer is positioned at a correction rate that exceeds the rate at which the first transducer encounters embedded servo sectors in the first track. As a result, the first transducer reduces or avoids flying-blind as it writes to the disk.

80 Claims, 6 Drawing Sheets

PARALLEL SERVO WITH ULTRA HIGH BANDWIDTH OFF-TRACK DETECTION

The present invention is a continuation-in-part of U.S. patent application Ser. No. 09/037,938 to Schreck et al. for "MULTIPLE READ ELEMENTS WHICH ARE OFFSET LATERALLY AND LONGITUDINALLY," filed Mar. 10, 1998 now U.S. Pat. No. 6,157,510, which is incorporated herein by reference in its entirety.

FIELD OF THE INVENTION

The invention relates generally to magnetic disk drive storage systems and, more specifically, to a method and an apparatus for combining servo sector positioning information with other non-servo sector positioning information to more accurately position a transducer over tracks on a disk of a disk drive system which utilizes an embedded servo sector scheme.

BACKGROUND OF THE INVENTION

A magnetic disk drive system is a digital data storage device that stores digital information within concentric tracks on a storage disk (or platter). The storage disk is coated with a magnetic material that is capable of changing its magnetic orientation in response to an applied magnetic field. During operation of a disk drive, the disk is rotated about a central axis at a substantially constant rate. To write data to or read data from the disk, a magnetic transducer is positioned above a desired track of the disk while the disk is spinning. As is well-known in the art, different techniques may be used to move the transducer from a current track to the desired track so that the transducer is properly positioned over the desired track for reading and writing.

Writing is performed by delivering a write signal having a variable current to a transducer while the transducer is held close to the rotating disk over the desired track. The write signal creates a variable magnetic field at a gap portion of the transducer that induces magnetic polarity transitions into the desired track. The magnetic polarity transitions are representative of the data being stored.

Reading is performed by sensing magnetic polarity transitions previously written on tracks of the rotating disk with the transducer. As the disk spins below the transducer, the magnetic polarity transitions on the track present a varying magnetic field to the transducer. The transducer converts the magnetic signal into an analog read signal that is then delivered to a read channel for appropriate processing. The read channel converts the analog read signal into a properly timed digital signal that can be recognized by a host computer system external to the drive.

The transducer is often dual-purpose, meaning the same transducer can both read from and write to the magnetic disk. Combining read and write functions into the same transducer allows some of the structure used for writing also to be used for reading. A dual purpose transducer cannot perform both read and write functions at the same time because, among other reasons: (1) their shared structures generally prohibit use of both functions at one time; and, (2) the magnetic field generated during a write operation tends to saturate the sensitivity of the read element.

Portions of a standard disk drive, generally designated 1, are illustrated in FIG. 1. The disk drive comprises a disk 4 that is rotated by a spin motor (not shown). The spin motor is mounted to a base plate (not shown). Data is stored on magnetic material which coats the two surfaces 5 (only one surface 5 is shown in FIG. 1) of the disk 4. An actuator arm assembly 7 is also mounted to the base plate.

The actuator arm assembly 7 includes a transducer 10 mounted to a microactuator arm 13 which is attached to an actuator arm 16. The actuator arm 16 rotates about a bearing assembly 19. The actuator arm assembly 7 cooperates with a voice-coil motor (VCM) 22 which moves the transducer 10 relative to the disk 4. The spin motor, voice-coil motor 22 and transducer 10 are coupled to a number of electronic circuits mounted to a printed circuit board (not shown). The electronic circuits typically include a read channel chip, a microprocessor-based controller and a random access memory (RAM) device, among other things.

The standard disk drive of FIG. 1 has a plurality of disks as shown in FIG. 2. Each of the plurality of disks 4 has two surface 5, with magnetic material on each of those surface 5. Therefore, in the disk drive shown in FIG. 2, two actuator arm assemblies 7 are provided for each disk 4. Each actuator arm assembly 7 has a transducer 10 which converts between electrical energy and magnetic energy. To position the transducer 10, the VCM 22 moves all actuator arms 16 in unison relative to their respective disks 4. It should be noted that generally only one transducer 10 is active at a time.

All actuator arms 16 in a multiple disk storage device are ganged together so that they move in unison with respect to the disk 4. The actuator arms 16 perform coarse positioning of the transducer 10, while the microactuator arms 13 perform fine position adjustments so that the transducer 10 is centered over a track 25 (see FIG. 1). As shown in FIG. 1, each microactuator arm 13 is pivotally connected to its respective actuator arm 16 and is capable of pivotable movement independent from the actuator arm 16, which allows for fine position adjustments. Movement of each microactuator arm 13 can be independently optimized for imperfections in the arcuate geometry of each track 25 on its corresponding magnetic surface 5. Although FIGS. 1 and 2 depict a transducer positioning system which contains both actuators and microactuators, more commonly, the combination of both positioning methods are not used in a given hard drive 1.

Actuator arm assemblies 7 containing both microactuator arms 13 and actuator arms 16 are, in some ways, advantageous as compared to actuator arm assemblies 7 containing solely actuator arms. For example, microactuator arms 13 have a smaller mass and are shorter in length, which allows them to be moved more rapidly onto the track centerline 40 (see FIG. 3) as compared to actuator arms 16.

Referring to FIGS. 1 and 3, data is stored on the disk 4 within a number of concentric radial tracks 25 (or cylinders). Each track 25 is divided into a plurality of sectors, and each sector is further divided into a servo region (or servo sector) 28 and a data region 31.

Servo sectors 28 are used to, among other things, provide transducer position information so that the transducer 10 can be accurately positioned by the actuator arm 16 and/or microactuator arm 13 over the track 25, such that user data can be properly written onto and read from the disk 4. The data regions 31 are where non-servo related data (i.e., user data) is stored and retrieved. Such data, upon proper conditions, may be overwritten. Because servo sectors 28 are embedded into each track 25 on each disk 4 between adjacent data regions 31, this type of servo-scheme is known by those skilled in the art as an embedded servo scheme.

As understood by those skilled in the art, it is desirable write information to and read information from a fixed position relative to the centerline 40 of the track 25. For ease of discussion, it is presumed within this application that the information is written to the track centerline 40, but the invention should not be so limited. After writing to the track centerline 40, the track centerline would contain a stronger magnetic signal than other portions of the track away from the centerline. The portion of the track 25 storing the strongest magnetic signal is defined herein as the magnetic center of the track. For the purposes of this application it is presumed information is written to the track centerline 40 which would mean the magnetic center of the track corresponds with the track centerline.

FIG. 3 shows a portion of a track 25 of a disk 4 drawn in a straight, rather than arcuate, fashion for ease of depiction. As is well-known, tracks 25 on magnetic disks 4 (as depicted in FIG. 1) are circular. Referring again to FIG. 3, each track 25 has a centerline 40. To accurately write data to and read data from the data region 31 of the track 25, it is desirable to maintain the transducer 10 (see FIG. 1) in a relatively fixed position with respect to a given track's centerline 40 during each of the writing and reading procedures.

With reference to FIGS. 1–3, to assist in controlling the position of the transducer 10 relative to the track centerline 40, the servo region 28 contains, among other things, servo information in the form of servo patterns comprised of one or more groups of servo bursts, as is well-known in the art. First and second servo bursts 46, 49 (commonly referred to as A and B servo bursts, respectively) are shown in FIG. 3. Servo bursts 46, 49 are accurately positioned relative to the centerline 40 of each track 25, and are typically written on the disk 4 during the manufacturing process using a servo track writer ("STW"). Unlike information in the data region 31, servo bursts 46, 49 may not normally be overwritten or erased during operation of the disk drive 1.

As the transducer 10 is positioned over the track 25, it reads the servo information contained in the servo regions 28 of the track, one servo region at a time. The servo information is used to, among other things, generate a position error signal (PES) as a function of the misalignment between the transducer 10 and the track centerline 40. The PES signal is provided as an input to a servo control loop which performs calculations and outputs a servo compensation signal which controls the VCM 22 to place the transducer 10 over the track centerline 40. When a write function is desired, the dual-purpose transducer 10 reads servo information from the servo region 28, is positioned over the track centerline 40 in the manner described above, and then writes to the disk 4 when the transducer 10 is over the data region 31 corresponding to the servo region 28 from which the servo information was obtained.

Referring to FIG. 4, a block diagram of a conventional embedded servo positioning system 60 is shown. The embedded servo positioning system 60 includes a transducer 10, a servo burst analyzer 72, a read positioning controller 80, a slow sampling switch 86, an actuator positioner 82, and a microactuator positioner 84. The transducer 10 reads the servo bursts 46, 49 (see FIG. 3) to produce an analog read signal 68 which is converted to a PES signal 76 by the servo burst analyzer 72. The PES signal 76 indicates how far the transducer 10 is from a position relative to the centerline 40 (see FIG. 3) of the track 25. To properly position the actuator arm 16 and microactuator 13 (see FIGS. 1 and 2) so that the transducer 10 is correctly aligned with the centerline 40 of the track 25, the read positioning controller 80 interprets the PES signal 76 in order to control the actuator and/or microactuator positioners 82, 84. A slow sampling switch 86 with a sample period of $T_s$ represents periodic encounters with embedded servo sectors 28 (see FIG. 3) which are used to adjust the position of the transducer using any combination of actuation and microactuator positioners 82, 84.

With reference to the embedded servo system shown in FIGS. 1 and 3, it should be noted that the only time that the transducer 10 can be adjusted for track centering, is when the transducer 10 reads servo information contained in the servo region 28. In other words, while either writing to or reading from the data region 31, the transducer 10 is "flying-blind" (defined herein to mean position error information is unavailable and positioning the transducer is not possible). While flying-blind, the transducer 10 will tend to drift from the centerline 40 of the track 25 because no position correction is possible.

It should also be noted that, by definition, user data is not stored in servo sectors 28. User data can only be stored in data regions 31 of the disk 4. Space on the disk surface 5 consumed by servo sectors 28 is considered wasted space because no user data can be stored in those areas. Currently, hard drive designers must balance the benefits provided by additional servo sectors 28 (i.e., more accurate positioning) with the wasted space consumed by the servo sectors.

FIG. 5 depicts an example path the transducer 10 (see FIGS. 1 and 3), controlled by the conventional embedded servo positioning system 60 (see FIG. 4), might follow with respect the centerline 40 (see also FIG. 3). The transducer 10 typically drifts away from the centerline while writing to data regions (see the first through the third data regions 92, 94, 96). The path of the transducer in the first, second and third data regions 92, 94, and 96 is represented by first, second and third curves 101, 102 and 103. After encountering each servo region 28, the transducer 10 is moved toward the centerline 40 using the actuator arm 16 and/or microactuator arm 13 (depicted in FIG. 1). The period at which the transducer 10 is positioned corresponds to the sample period 88 (see FIG. 4) of the embedded servo control system 60. The path of the transducer 10 in the first data region 92 (first curve 101) illustrates how mechanical disturbances modulate the motion of the transducer away from a normal linear drift from track centerline 40. Some examples of mechanical disturbances are motor vibration, transducer vibration and motor rocking. Between each data region 31, the transducer 10 is positioned by analyzing servo information 132 as shown in FIG. 5. When the transducer 10 drifts an excessive distance from the centerline 40, as illustrated in the second data region 94 (see the second curve 102), a subsequent read operation will not properly recover the data previously written when the transducer is placed above the centerline to read such data. The third data region 96 illustrates the effect an external shock would have on the position of the transducer during a write operation (see the third curve 103). It should be noted that the frequency at which the transducer may be positioned to compensate for mechanical disturbances (see the first curve 101) and external shock (see the third curve 103) is limited by the frequency at which the embedded servo positioning system 60 (see FIG. 4) samples. Unfortunately, the period between recurring sample periods 88 is often too large to avoid excessive write to read track misregistration as demonstrated in the second and third data regions 94, 96 (see second and third curves 102, 103).

Referring once again to FIG. 4, a disadvantage to using the conventional embedded servo positioning system 60 is the large period between position corrections 88. The embedded servo positioning system 60 only samples the PES signal 76 while the transducer 10 is over the servo region 28 (see FIG. 1). The relatively few periodic encounters with the servo region 28 result in the transducer 10 flying-blind most of the time, i.e., without off-track position information.

To minimize drift and ensure that the transducer is maintained over the centerline 40 (see FIG. 3) of the track 25, the number of servo sectors 28 could be increased which would increase the frequency of sampling periods 88 of the PES signal 76. The problem with increasing the number of servo regions 28, however, is that the additional servo regions would occupy valuable portions of the magnetic surface 5 which leaves less space available for data storage. Therefore, there is a need for decreasing the period between sample periods 88 made by the embedded servo positioning system 60 which minimizes (or, at least, does not increase) the number of servo regions 28.

As shown in FIG. 5, the drift of the transducer 10 (shown in FIG. 1) while flying-blind in the embedded servo positioning system 60 can cause write to read track misregistration (WRTMR). For example, if information is written when the transducer 10 is not properly positioned over the centerline 40 of the track 25 (as happens toward the end of the second and third data regions 94, 96), a subsequent read operation would not produce a strong analog read signal when the transducer is over the centerline of the track. Rather, a weak analog read signal would be produced which may cause an increase in bit error rate (BER). In order to reduce the BER, it would be desirable to reduce the flying-blind time of the transducer 10 which would produce more accurate alignment between write and read operations (i.e., would reduce WRTMR).

Although not shown in the figures, all servo information can reside on a dedicated surface of one disk, while all other disk surfaces contain solely user data. This arrangement is referred to by those skilled in the art as a dedicated servo positioning system. In such a system, a servo transducer, which reads servo information from the dedicated servo surface, provides positioning information to the other transducers while they are reading from and writing to the other disk surfaces. In other words, the servo transducer constantly reads servo information from the dedicated servo surface to provide positioning corrections to the other transducers which read and write data to their respective disk surfaces 5.

FIG. 6 shows a block diagram of a conventional dedicated servo positioning system 104. The dedicated servo positioning system 104 includes a dedicated servo surface transducer 105, a servo burst analyzer 108, a write and read positioning controller 112, a sampling switch 116, and an actuator positioner 82. Each transducer, which writes and reads user data information, is positioned by the dedicated servo surface transducer 105 which reads servo information from the dedicated servo surface. An analog read signal 106 is produced by the dedicated servo surface transducer 105 and is analyzed by the servo burst analyzer 108 to produce off-track position information 110. The write and read positioning controller 112 uses the off-track position information 110 to provide corrections to the actuator positioner 82. In this way, all transducers 10 in the drive 1 (see FIG. 1) are properly positioned over the desired track 25 without flying-blind.

Obviously, the dedicated servo positioning system 104 of FIG. 6 provides positioning corrections more frequently than the embedded servo positioning system 60 of FIG. 4. In addition, it should be noted that in the dedicated servo positioning system 104, position corrections are possible while writing to the data region 31 of the track 25. Position corrections occur periodically as represented by the sampling switch 116 having a sample period of $T_{f1}$. The limited response times of mechanical actuator arm 16 and microactuator arm 13 serve to limit the frequency at which the position of the transducer 10 can be adjusted in both dedicated and embedded servo positioning systems.

The dedicated servo positioning system 104, in some ways, is desirable over an embedded servo positioning system because it avoids flying-blind. It should be noted, however, that dedicated servo positioning systems have several disadvantages including the extraordinary amount of storage area that is occupied by servo information in such systems and problems associated with thermal expansion and/or manufacturing tolerances.

With respect to the storage space occupied by the dedicated servo information, disk drives 1 (see FIG. 1) which have three or fewer platters (or disks) 4 are considered by those skilled in the art as poor candidates for dedicated servo. For example, a disk drive 1 which has three platters (or disks) 4 provides six magnetic surfaces 5. Since the dedicated servo arrangement requires one of the six surfaces to be completely occupied with servo information, one-sixth of the available storage area is wasted and cannot store user data.

When there are many platters 4 (see FIG. 1) in the disk drive 1 of a dedicated servo positioning system, problems associated with thermal expansion and/or manufacturing tolerances may occur. The more platters between the dedicated servo surface and the other surfaces, the larger the inaccuracies in positioning. These inaccuracies result from, among other things, differing temperatures throughout the disk drive 1 which can cause differing amounts of thermal expansion within the drive. Additionally, more platters will increase the manufacturing tolerance between the dedicated servo transducer and the other transducers. Therefore, a need arises for avoiding flying-blind without the disadvantages associated with dedicated servo positioning systems 104 (see FIG. 6).

In summary, it would be desirable to develop a transducer positioning system which: (1) avoids flying-blind (and/or reduces the amount of time flying-blind) without the disadvantages associated with dedicated servo positioning systems; and, (2) increases the sampling rate of the servo control loop while minimizing (or, at least, not increasing) the number of servo sectors in an embedded servo positioning system.

SUMMARY OF THE INVENTION

It is an object of the present invention to develop a transducer positioning system which: (1) avoids flying-blind (and/or reduces the amount of time flying-blind) without the disadvantages associated with dedicated servo positioning systems; and, (2) increases the sampling rate of the servo control loop while minimizing (or, at least, not increasing) the number of servo sectors in an embedded servo positioning system.

In accordance with the invention, a magnetic storage system having one or more rotating disks is disclosed. In a preferred embodiment, each rotating disk has two magnetic surfaces, each containing a number of tracks. Each track has one or more data regions and one or more embedded servo sectors. First and second transducers are respectively suspended over first and second tracks corresponding to first and second magnetic surfaces, respectively. The second transducer determines an off-track position with respect to the second track by reading from the data region of the second track. Once the off-track position is determined for the second transducer, that information is used to position the first transducer with respect to the first track.

A method for positioning two or more transducers within a magnetic storage disk drive is also disclosed. In a first step, there are provided one or more disks with each having two magnetic surfaces. Each magnetic surface has a number of tracks and a transducer. The tracks are subdivided into servo sectors and data regions. A first transducer, which writes to a first track on a first surface, is paired to a second transducer, which reads from a second track on a second surface. The position of the first transducer is determined by the second transducer which reads positioning information from the data region of the second track.

Other objects, features and advantages of the invention will be apparent from the following specification taken in conjunction with the following drawings.

DETAILED DESCRIPTION

Figure 1:
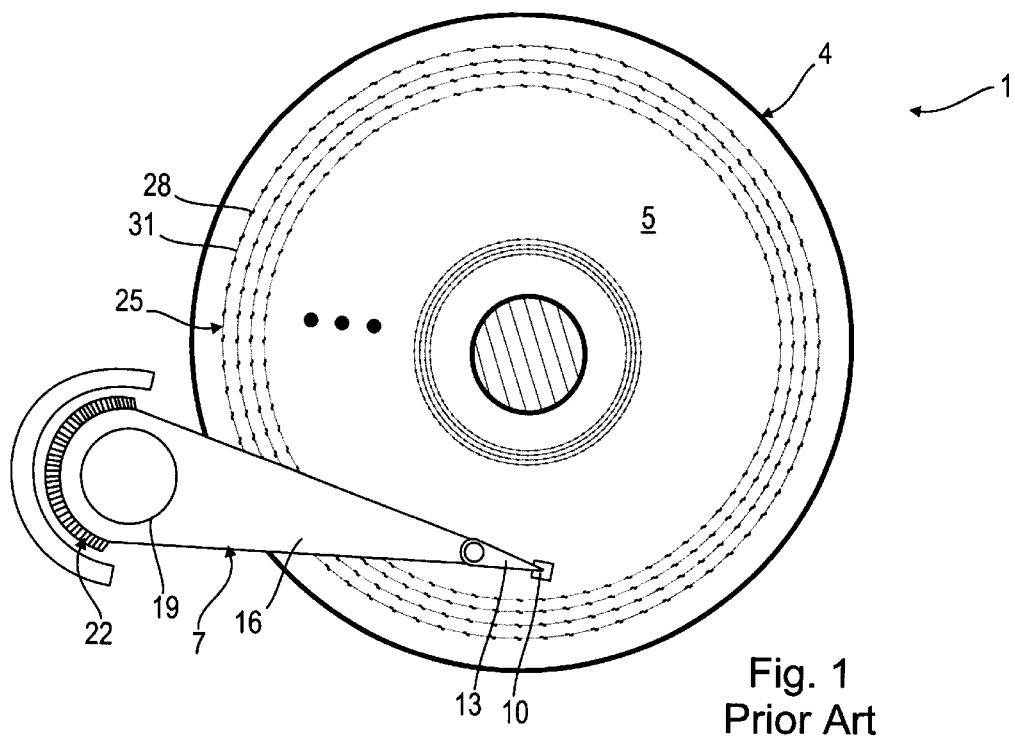
FIG. 1 is a top view showing portions of a conventional magnetic disk drive system with dual stage actuators where some of the many tracks on the surface of the disk are accentuated.

While this invention is susceptible of embodiments in many different forms, there is shown in the drawings and will herein be described in detail, a number of preferred embodiments of the invention with the understanding that the present disclosure is to be considered as an exemplification of the principles of the invention and is not intended to limit the broad aspects of the invention to the embodiments illustrated.

As will be described in detail below, multiple offset read elements allow for masslessly sensing the distance between a transducer and the portion of a data region of a track with the strongest magnetic signal (defined herein as the magnetic center) while reading. By using multiple offset read elements, the transducer can be positioned over the data region of the track, unlike conventional embedded servo positioning systems which can only be positioned over the servo sector region.

Flying-blind while writing to the data region of the track is reduced and/or avoided by pairing a first transducer and a second transducer. The second transducer has multiple offset read elements which read from a data region of a second track in order to provide transducer positioning information based upon the second transducer's distance from the magnetic center of the second track. The positioning information is analyzed in order to position both the first transducer and the second transducer, which performs a write operation on a first track, based upon the second transducer's position relative to the magnetic center of the second track. In this way, the first transducer reduces and/or avoids flying-blind while writing to the disk. As will be understood by those skilled in the art, effective pairing of the first and second transducers requires the magnetic center of the second track to generally correspond with the centerline of the track being written to by the first transducer.

Figure 7:
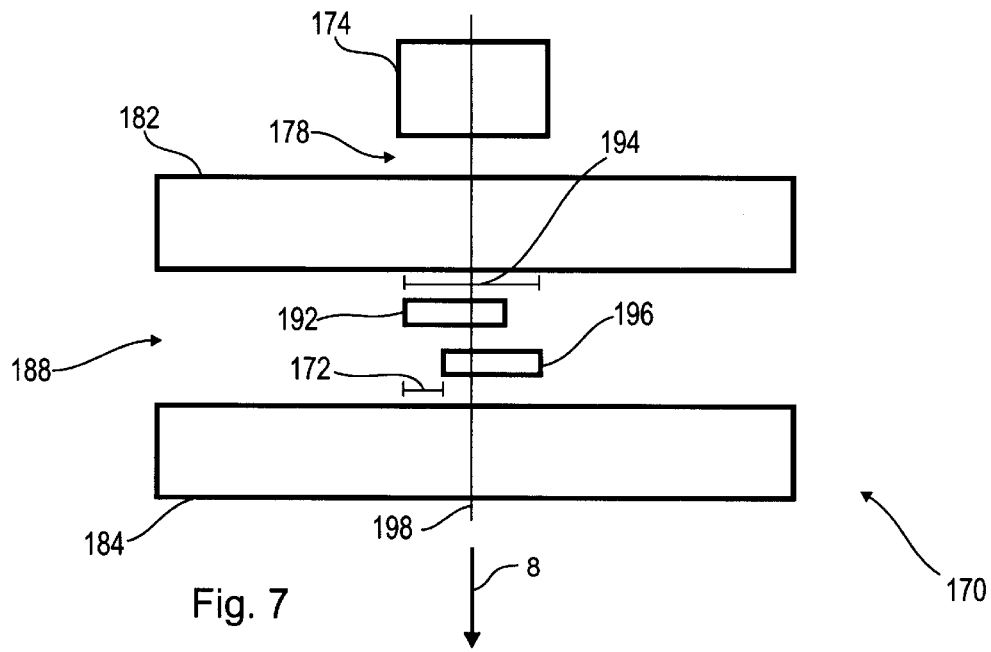
FIG. 7 is a top view of a first embodiment of the transducer of the present invention wherein the illustrated portion of the transducer faces the magnetic disk.
Figure 8:
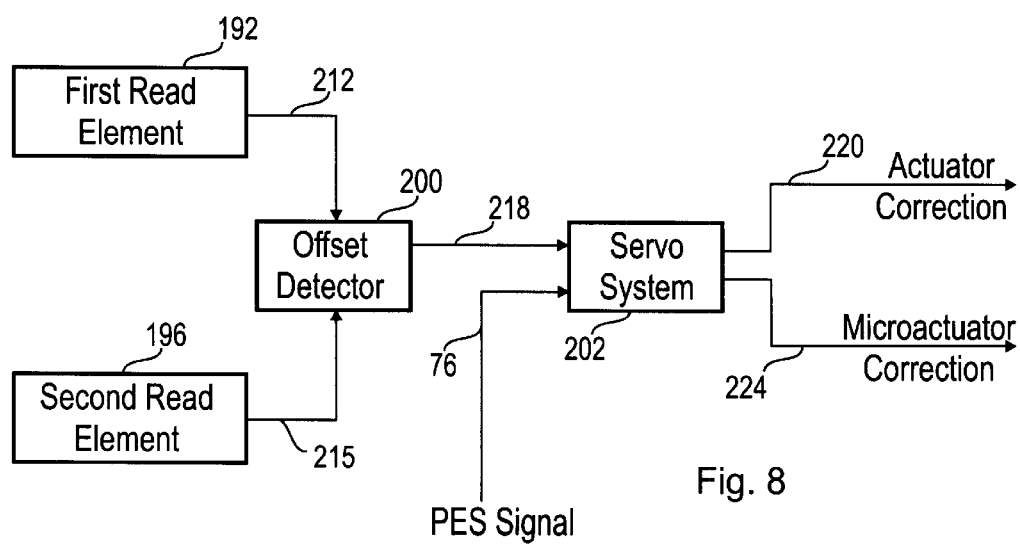
FIG. 8 shows a logic block diagram illustrating the manner by which the magnetic signals read by first and second read elements are processed to provide massless position sensing.

The physical configuration of a dual-purpose transducer having multiple offset read elements is depicted in FIG. 7 while some of the processing steps performed within a read channel are shown in FIG. 8. Further details of multiple offset read elements may be found in U.S. patent application Ser. No. 09/037,938 to Schreck et al. which, as mentioned above, is specifically incorporated herein by reference in its entirety.

The dual-purpose transducer, generally designated 170, used for reading and writing magnetic polarity transitions to a magnetic media (not shown) is illustrated in FIG. 7. Referring to the figure, portions of the transducer 170 which face the magnetic media are shown. The part of the transducer 170 shown in this view is commonly called the air bearing surface. The transducer 170 includes a write pole 174, write gap 178, first shield 182, second shield 184, read gap 188, first read element 192, and second read element 196. It should be noted that although a dual-purpose transducer is shown and described herein, only first and second read elements 192, 196 are used to determine the distance between the transducer 170 and the magnetic center of the track 25 (see FIG. 3).

As part of the writing process, a variable current is used to induce magnetic flux across the write gap 178 between the write pole 174 and the first shield 182. The write pole 174 and first shield 182 act as the two poles of an electromagnet which is used to induce magnetic flux across the write gap 178. The direction of the variable current defines the direction in which the magnetic flux will be oriented across the write gap 178. In some simple recording systems, flux polarized in one direction across the write gap 178 will record a binary "one" on the magnetic media while flux polarized in the opposite direction will record a binary "zero." In most recording systems, a change in the direction that the flux travels across the gap 178 is interpreted as a "one" while the lack of a change is interpreted as a "zero." As the magnetic material on the disk surface 5 (shown in FIG. 1) travels under the transducer 170 in the direction shown by arrow 8, a series of digital "ones" and "zeros" can be written within a track 25 (shown in FIG. 3).

When reading, the magnetic polarity transitions previously written onto the magnetic media are coupled to the transducer 170 in order to recover the stored digital data.

Magnetoresistive (MR) sensors are commonly used in read elements because they change resistance when exposed to a magnetic field. When a magnetic polarity transition on the magnetic media passes under the transducer, the first and second read elements 192, 196 will each generate a signal in response to the changing magnetic field which corresponds to a previously recorded data bit. These signals are called analog read signals. Conversion of the analog read signal back into a digital signal is performed within a read channel, after which it is passed to an exterior environment such as a computer. During the read process, the first and second shields 182, 184 form a read gap 188 which serves to focus the flux for a particular magnetic polarity transition onto the read elements by shielding the flux from other sources of magnetic flux. In other words, extraneous magnetic flux is filtered away from the read elements by the shields 182, 184.

Referring now to FIG. 8 which determines off-track position, first and second read elements 192, 196, along with a portion of a read channel, are illustrated in block diagram form. The portion of the read channel shown in FIG. 8 includes an offset detector 200 and a servo system 202. It should be noted that some of the aforementioned block diagram elements may also be located outside of the read channel as will be appreciated by those skilled in the art.

The first and second read elements 192, 196 respectively produce a first analog read signal 212 and a second analog read signal 215. The first and second analog read signals 212, 215 are generated from the read elements as the magnetic polarity transitions recorded on the magnetic media pass under the read elements. In other words, the first and second analog read signals 212, 215 are the electronic equivalent to the magnetic signal stored on the magnetic media as respectively read by the first and second read elements 192, 196. The magnetic media contains tracks 25 (see FIG. 1) which store the magnetic signal previously written to the disk 4. Since the first and second read elements 192, 196 are physically offset in the lateral direction (as illustrated in FIG. 7), at any given time, the center of one of the read elements tends to be closer to the magnetic center of the track than the other. As a result of the lateral offset 172 (shown in FIG. 7) between the first and second read elements 192, 196, the relative magnitude of the analog read signal from the read element closest to the magnetic center of the track will be larger than the relative magnitude of the other analog read signal.

The offset detector 200 receives the first analog read signal 212 and the second analog read signal 215 as inputs. The offset detector 200 also analyzes the relative magnitudes of the first and second analog read signals 212, 215 to determine how far each read element is physically from the magnetic center of the track. Generally, the larger the relative magnitude of an analog read signal the closer the read element is to the magnetic center of the track. The result of this analysis is reflected in an off-track position signal 218. It should be noted that flying height variation can change the magnitude of the first and second analog read signals 212, 215, which is why the relative magnitude between the first and second read elements 192, 196 must be used to determine offset from the magnetic center of the track 25 (see FIG. 3).

Figure 3:
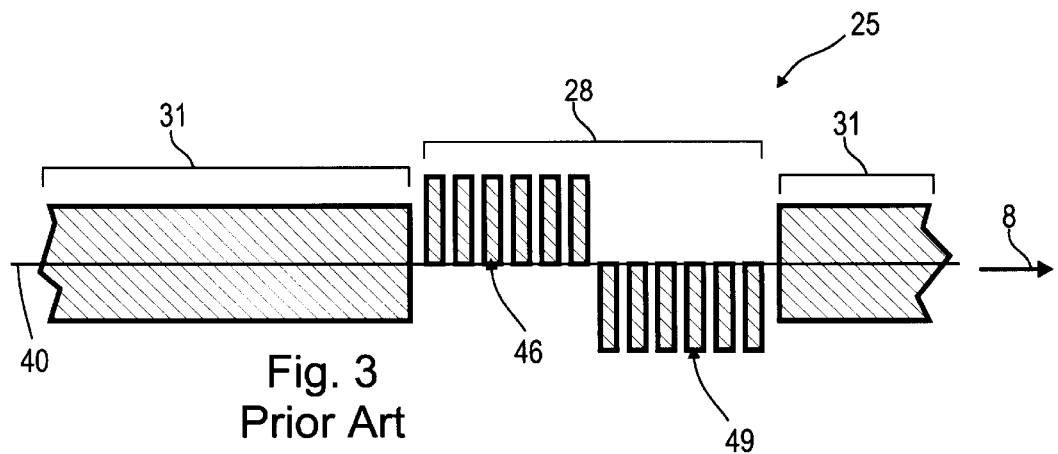
FIG. 3 is a diagram illustrating a portion of a conventional track on which information is stored, the track includes a recurring periodic servo sector and is shown as a straight, rather than curved, section for ease of depiction.

Referring still to FIG. 8, the servo system 202 adjusts the physical position of the transducer 170 (see FIG. 7) with respect to the track 25 (see FIG. 3). The off-track position signal 218 and a conventional position error signal (PES) 76 are analyzed by the servo system 202 to produce an actuator correction signal 220 and a microactuator correction signal 224. A feedback loop (not shown) within the servo system 202 utilizes both differential and integral components, as well as selective filtering, to determine how to best position the transducer 170 (see FIG. 7). To position the transducer 170, the servo system 202 produces the actuator correction signal 220 and microactuator correction signal 224 which are used to physically move the center of the transducer to a position over the magnetic center of the track. The center 198 of the transducer 170 (shown in FIG. 7) is defined herein as a center of a sum of the lateral distance 194 covered by all read elements 192, 196. It should be noted that the proper location of the transducer 170 is important because, as the write to read track misregistration (WRTMR) decreases, the likelihood of read errors also decreases. In other words, the closer a read element is to the portion of the track previously written to, the less likely there will be bit errors during the read process.

The dual-purpose transducer 170, as described above, contains two read elements, but finding the magnetic center of the track 25 (see FIG. 3) is possible with more than two read elements. In a more than two read element embodiment, the offset detector 200 could compare the amplitude of many analog read signals to determine which read element was closest to the magnetic center of the track 25. Having more than two read elements improves the ability to masslessly find the portion of the track with the strongest magnetic signal.

Figure 9:
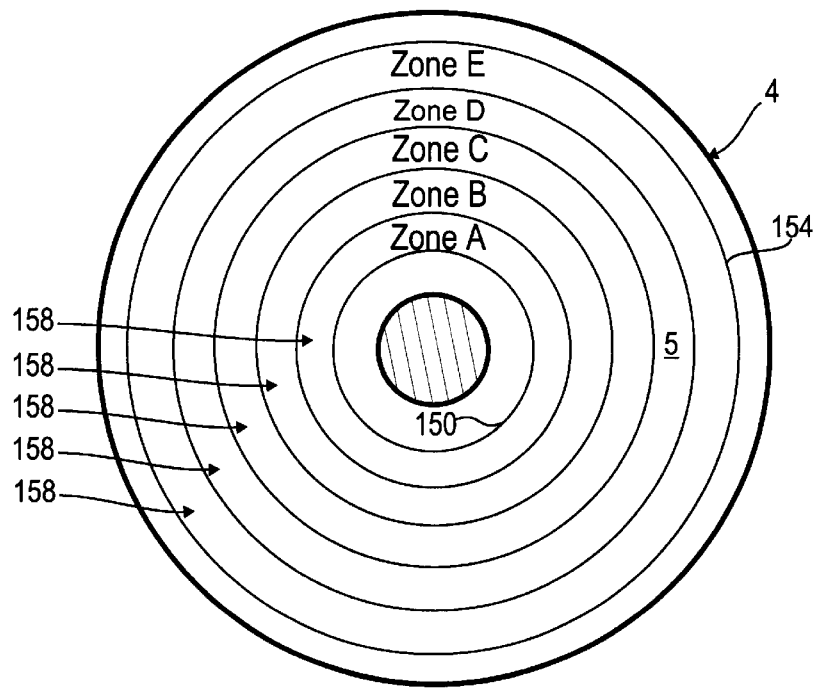
FIG. 9 is an illustration of a magnetic disk divided into a number of zones where each zone contains a number of tracks (not shown)

FIG. 9 shows a rotating disk 4 having a number of zones 158 labeled A through E. Each of the zones 158 contains many concentric circular tracks 25 (depicted in FIG. 1) which extend from the inner radius of the disk (ID) 150 to the outer radius of the disk (OD) 154. The tracks 25 are numbered consecutively from the inner radius 150 to the outer radius 154 of each surface 5 of the disk 4. Each disk has the same quantity of consecutively numbered tracks 25 which are divided among the zones. Only five zones 158 are depicted in the figure, but those skilled in the art will understand that there can be many more zones.

Figure 10:
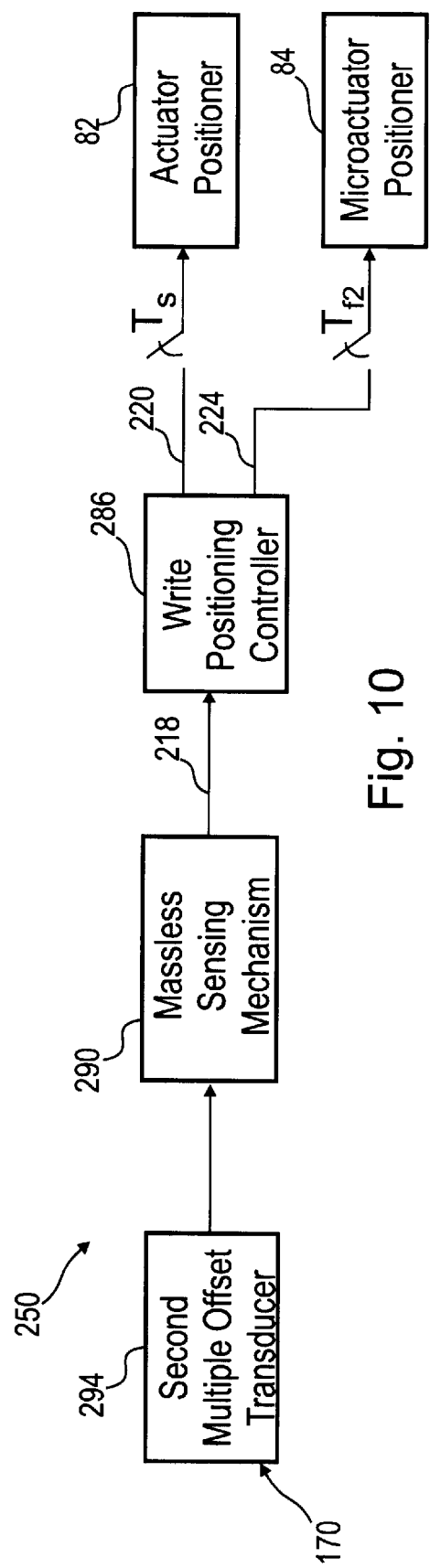
FIG. 10 is a block diagram depicting the sources and destinations of off-track position information for centerline correction during write operations.

An embedded servo positioning system 250, shown in FIG. 10, positions the transducer 170 while performing a write operation so that flying-blind is reduced and/or eliminated. As described above, the multiple offset read elements provide massless position sensing while reading to provide continuous positioning information. To reduce and/or eliminate flying-blind while a first transducer performs a write operation, a second transducer with multiple offset read elements performs a read operation in parallel to a similar track, as described below.

Figure 6:
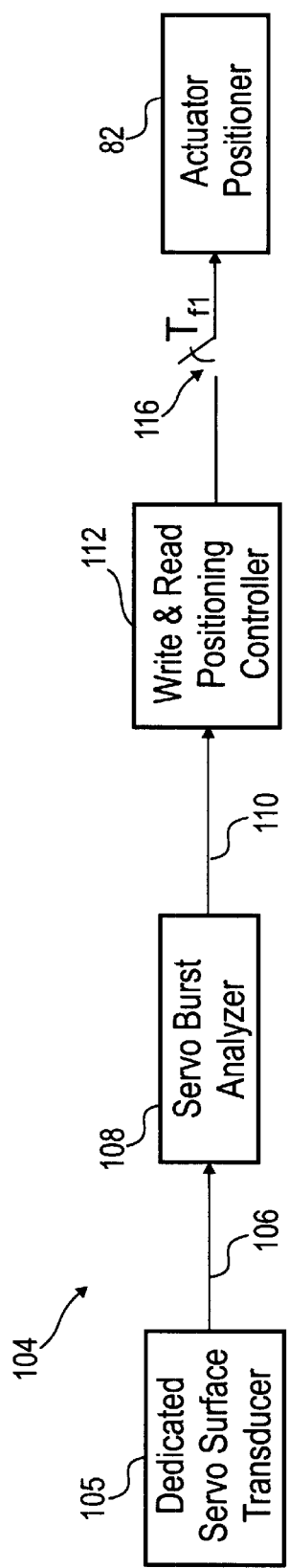
FIG. 6 is a block diagram showing a conventional dedicated servo positioning system.

In accordance with this invention, flying-blind is reduced and/or avoided while writing to the disk 4 (see FIG. 1) without resorting to use of a dedicated servo scheme 104 (see FIG. 6). As discussed above, the shared structures in a dual-purpose transducer 10 (see FIG. 1) prohibit the same transducer from reading and writing at the same time, and since the methods for determining position require the transducer 10 to read, position corrections would normally be impossible while writing.

Figure 2:
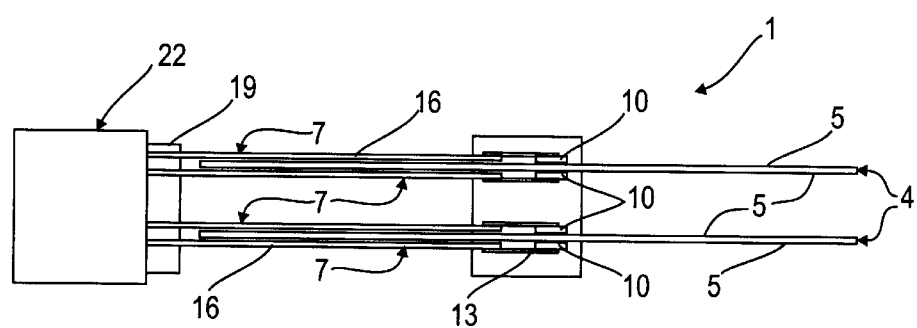
FIG. 2 is a side view of the drive in FIG. 1 showing two disks, each of the disks having two surfaces and an actuator arm corresponding to each disk surface.

With reference to FIG. 10, to reduce and/or avoid flying-blind while writing, a write positioning controller 286 receives transducer position information from a second massless sensing transducer 294 reading from the same track number on a different disk surface 5 (shown in FIG. 2). The off-track position determination mechanism from the second transducer 294 is coupled to the positioning mechanism of a first transducer (not shown) performing the write function in parallel. The write positioning controller 286 analyzes the signal from the massless sensing mechanism 290 of the read channel to provide positioning information to the actuator positioner 82 and the microactuator positioner 84 of the first transducer. Preferably, the off-track position from the second transducer 294 is used to correct the position of both first and second transducers in parallel.

The massless sensing mechanism 290 utilizes the second transducer 294 in the magnetic disk storage system 1 (see FIGS. 1 and 2) to position the first transducer (not shown) which is writing to the disk. Accordingly, every track which is written to has a predetermined track on another disk surface 5 (see FIG. 1) which is read from to determine off-track position while such track is being written to. The pairing between tracks can be stored in a look-up table after calibration has been performed. During a preferred calibration procedure, each transducer is paired with another transducer for a particular zone 158 (see FIG. 9) on the disk 4 (see FIG. 1). The pairing is based on which two disk surfaces 5 (see FIG. 2) have the most similar track geometries within that zone 158. In the preferred method of calibration, only one track 25 within each zone 158 is compared to determine the optimum track pairing within that zone, but more elaborate comparisons of tracks could also be done. Later, this process is illustrated with an example. It should be noted that the pairing of transducers could be performed at the time of manufacture or periodically after the disk drive 1 has reached the end user.

Once all transducers (and their corresponding disk surfaces) are paired for each zone during calibration, a second transducer is used in parallel with a first transducer to determine positioning of the first and second transducers while data is written to a particular data region by the first transducer (not shown). While the first transducer is writing data to a first track on a first surface, the second transducer 294 is reading from a second or parallel track on a second surface in order to position both first and second transducers. Generally, first and second tracks are located at the same radial distance on their respective disks.

Any one of two methods can be used to position the first and second transducers 294 while performing a write operation: (1) by moving the actuator arms 16 (shown in FIG. 1) using actuator positioner 82; and/or (2) by positioning the microactuator arm 13 using microactuator positioner 84. All actuator arms 16 (see FIG. 1) are ganged together to move in unison, while the microactuator arms 13 can move their respective transducers 170 independently. In a preferred embodiment, the actuator positioner 82 corrects at of rate of $1/T_s$ after each servo sector 28 (see FIG. 3) and at a rate of $1/T_{f2}$ while reading from the data region 31 of the track 25. The period between samples $T_{f2}$ is only limited by the response time of the mechanical microactuator arm 13.

The use of paired transducers during writing to position both first and second transducers in parallel is best illustrated with an example. For instance, a write operation is to occur on the 81$^{st}$ track of a top side of a first disk within the magnetic disk storage system 1. First, it must be determined which zone 158 (shown in FIG. 9) the 81$^{st}$ track falls within. If each zone contains forty tracks, the 81$^{st}$ track would be the first track in Zone C. A look-up table (or the like) is referenced to determine which second transducer 294 is paired to the first transducer for Zone C on the top side of the first disk 4 (i.e., which disk surface of the other disks has track geometries most similar to that of the top side of the first disk in Zone C). It should be noted that previously, during calibration, the 100$^{th}$ track on the top surface of the first disk was compared with the 100$^{th}$ track for all other magnetic surfaces to determine the pairing for all the tracks within Zone C.

Next, the first transducer and the second transducer 294 are moved to their respective 81$^{st}$ tracks in order to read the next servo sector 28 (see FIG. 3). As the servo sector 28 passes beneath both the first and the second transducers, the actuator arm 16 and/or microactuator arm 13 are used to position both transducers relative to the centerline 40 (see FIG. 3) of their respective 81$^{st}$ tracks. Once past the servo sector 29, the first transducer is switched to write mode while the second transducer 294 continues to read from its respective disk. While the first transducer performs the write, the second transducer 294 uses the multiple offset read elements 290 to determine when both transducers are drifting away from the magnetic center of the track 25 (see FIG. 3). The write positioning controller 286 receives positioning information from the second transducer 294 and produces the appropriate positioning correction for both transducers. Positioning is performed by using the appropriate combination of actuator 82 and/or microactuator 84 positioner.

Referring once again to FIG. 10, any combination of actuator positioning 82 and/or microactuator positioner 84 could be used to position the transducer 170 (see FIG. 7). Generally, the actuator arm 16 (see FIG. 1) responds slower to requests to adjust position than the microactuator arm 13 because the actuator has a larger mass. That is why the preferred embodiment 250 uses actuator positioner 82 to make large adjustments over the servo sector 28 and microactuator positioner 84 to make small adjustments over the data region 31. However, in an alternate embodiment, software algorithms could choose between actuator and microactuator positioner 82, 84 to position the first and second transducers most efficiently.

Other embodiments could solely use actuator positioner 82, without any microactuator positioner 84, to avoid adding the additional microactuator arm 13. In such an embodiment, all positioning would be performed by the actuator arm 16.

Insight into the transducer positioning system 250 can be gained by comparison to conventional dedicated servo positioning system 104 (shown in FIG. 6). As discussed above, the dedicated servo surface transducer 105 (see FIG. 6) constantly reads to provide positioning information for a first transducer (not shown) while the first transducer writes to the data region 31 (see FIG. 1) of the track 25. In other words, the first transducer is always paired with the dedicated servo surface transducer 105 in the conventional dedicated servo positioning system 104. In contrast, the preferred embodiment 250 shown in FIG. 10 allows dynamic pairing of the first transducer with the second transducer 294 based upon the predetermined pairing stored in the look-up table.

It should be noted that even though the embodiment described above uses multiple offset read elements to provide positioning information while reading the data region 31 of a corresponding track 25, any method which provides positioning information while reading the data region 31 could be utilized to reduce and/or avoid flying-blind during writing. The idea of using a second transducer which provides positioning information to a first transducer which is writing to the data region of the track is not dependent upon the method by which the positioning information is provided.

Figure 4:
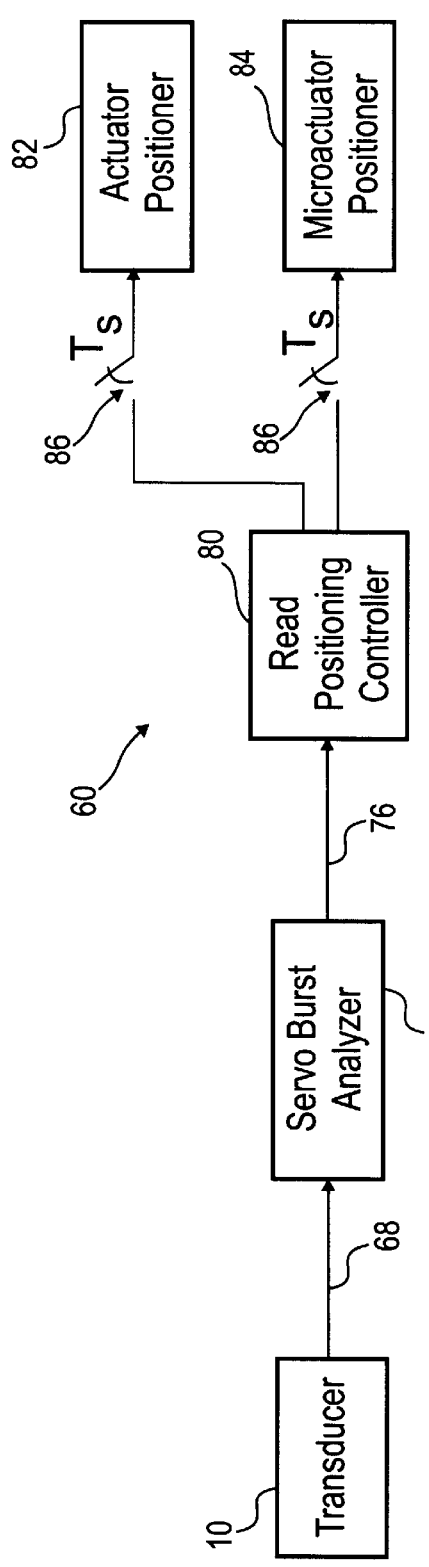
FIG. 4 is a block diagram of a conventional embedded servo positioning system.
Figure 5:
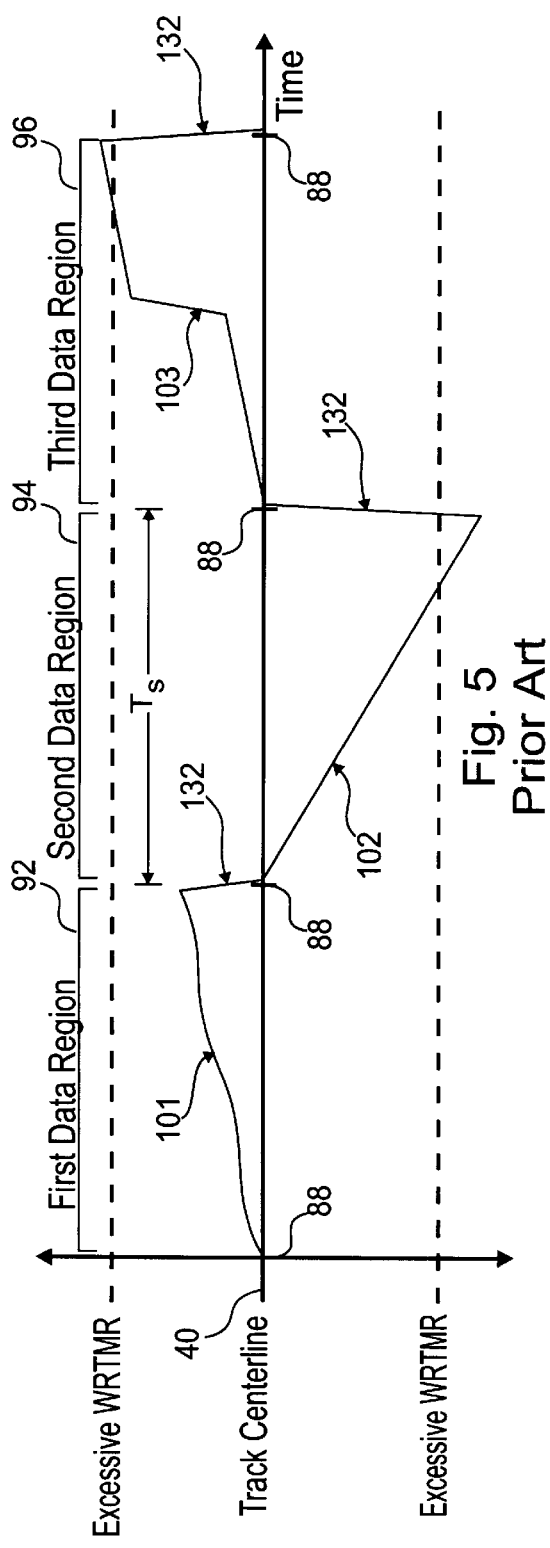
FIG. 5 is a graph showing transducer position relative to the track centerline in the ordinate direction with time along the abscissa for a conventional embedded servo positioning system.
Figure 11:
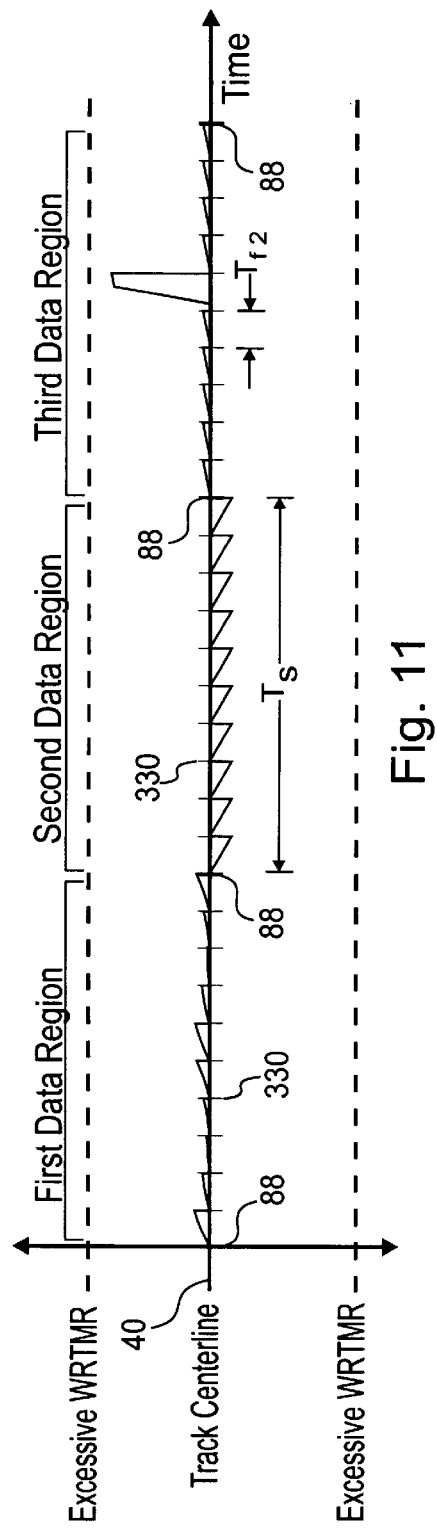
FIG. 11 is a graph showing transducer position relative to the track centerline in the ordinate direction with time along the abscissa for the servo positioning loop of the present invention where the disk drive is subjected to the same disturbances as the conventional embedded servo positioning system of FIG. 5.

Reference is made to FIGS. 5 and 11 which respectively show transducer position over three data regions for conventional and preferred embedded servo configurations. FIG. 11 depicts an example of a path the transducer 170 (see FIG. 7) controlled by the preferred embodiment 250 (see FIG. 10) might follow with respect the centerline 40 (see FIG. 3). It should be noted the movement of the transducer 170 for the preferred embodiment 250 in FIG. 11 is subjected to the same disturbances as the conventional embedded servo positioning system 60 (see FIG. 4) is subjected to in FIG. 5. Where the conventional transducer 10 (see FIG. 1) drifts excessively far from the centerline 40 and causes unacceptable WRTMR, the transducer 170 of the preferred embodiment is maintained close to the centerline because of a decreased period between corrections ($T_{f2}$) made by the microactuators 13. During the write operation, the preferred embodiment 250 makes large adjustments to the transducer position using the actuator arm 16 (see FIG. 1) after each $T_s$ period and makes small adjustments using the microactuator arm 13 after each $T_{f2}$ period. In this way, the factors which cause misalignment such as drift, external shock, and mechanical disturbance are corrected at a higher frequency then conventional embedded servo positioning system 60 (see FIG. 4), thereby maintaining proper alignment between the transducer 170 and centerline 40 while writing to the data region 31.

Although FIGS. 1 and 2 show two disks, embodiments of the present invention could have as few as one disk 4 (see FIG. 1). With only one disk 4 there would be only two actuator arm assemblies 7. Therefore, the two transducers 170 (see FIG. 7) would always be paired such that one transducer acted as the first transducer during writing while the second transducer 294 (see FIG. 10) reads from the data region to provide positioning information to both transducers. Even with only one disk, flying-blind would be reduced and/or avoided while writing, and the system would not have the drawbacks associated with conventional dedicated servo positioning system 104 (see FIG. 6). A conventional single disk dedicated servo positioning system 104 would require one surface or 50% of the total storage area be devoted to servo information which, although flying-blind is reduced and/or avoided, reduces the ability to efficiently store data on the magnetic disk 4.

Another advantage of the present invention is that storage densities may be improved. Since flying-blind while writing to the disk is reduced and/or avoided, there would be improved alignment between write and read functions. In other words, achieving smaller write to read track misregistration (WRTMR) will allow information to be stored closer to the track center so that track widths may be reduced. The tolerance of writing to the track centerline 40 affects the amount of wasted space which must be set aside between adjacent tracks. Reducing wasted space increases the storage density of the magnetic media associated with disk surfaces 5. Therefore, reducing the time in which the transducer 170 is flying-blind is desirable because it allows the tracks 25 to be more tightly packed together which improves storage efficiency.

Although the discussion, thus far, has been limited to magnetic disks, the invention should not be so limited. As those skilled in the art will appreciate, this invention can also be applied to magneto-optical disks and magnetic drums, among other things.

As already noted herein, data could be written to and read from a position offset from the track centerline 40 (see FIG. 3). This would mean the second transducer, which is reading from the track 25 to determine track offset, would be positioned over the magnetic center of track which is offset relative to the track centerline 40. As position is adjusted for the second transducer, so is the position of the first transducer which is writing to the disk. Therefore, both the first and second transducers maintain a position offset from the track centerline 40.

It will be understood that the invention may be embodied in other specific forms without departing from the spirit or central characteristics thereof The present examples and embodiments, therefore, are to be considered in all respects as illustrative and not restrictive, and the invention is not intended to be limited to the details given herein.

What is claimed is:

1. A magnetic storage system having one or more rotating disks, comprising:
   a plurality of tracks on each rotating disk;
   one or more embedded servo sectors within each of the plurality of tracks;
   a first transducer suspended above one of the plurality of tracks;
   a second transducer; and
   a circuit that provides a correction rate at which the position of the first transducer is adjusted, wherein the correction rate exceeds a rate at which the first transducer encounters the embedded servo sectors, and the correction rate is responsive to user data read by the second transducer.

2. The magnetic storage system of claim 1, wherein the first transducer is a dual-purpose transducer for both reading and writing.

3. The magnetic storage system of claim 1, wherein the first transducer includes multiple offset read elements.

4. The magnetic storage system of claim 1, wherein the first transducer includes one or more read elements and the read elements include magnetoresistive material.

5. The magnetic storage system of claim 1, further including:
   two magnetic surfaces on each rotating disk, wherein there is at least a first magnetic surface and a second magnetic surface;
   the first transducer operatively engaged with the first magnetic surface; and
   the second transducer operatively engaged with the second magnetic surface, wherein the second transducer reads the user data from a data region of the second magnetic surface to provide positioning information to the first transducer as it writes to the first magnetic surface.

6. The magnetic storage system of claim 1, wherein:
   each rotating disk has two magnetic surfaces;
   the plurality of tracks are on both magnetic surfaces for each rotating disk;
   the plurality of tracks are grouped to form a plurality of zones; and
   each zone is paired with a corresponding zone on another magnetic surface.

7. The magnetic storage system of claim 6, wherein each zone is paired by comparing a geometry of a first zone matching track on a first magnetic surface with a geometry of a second zone matching track on a second magnetic surface, wherein the first zone matching track and the second zone matching track are generally located at a same radial distance from a center of the rotating disk.

8. The magnetic storage system of claim 1, wherein the rotating disks are magneto-optical disks.

9. A magnetic storage system having one or more rotating disks, comprising:
   a first track and a second track, each including:
      a data region, and
      one or more embedded servo sectors;
   a first transducer suspended over the first track; and a second transducer suspended over the second track, wherein:
  the second transducer determines an off-track position with respect to the second track by analyzing the data region of the second track without analyzing any other tracks, and the position of the first transducer with respect to the first track is adjusted based upon the off-track position determined by the second transducer.

10. The magnetic storage system of claim 9, wherein the second transducer is a dual-purpose transducer used for both reading and writing.

11. The magnetic storage system of claim 9, wherein the second transducer includes multiple offset read elements.

12. The magnetic storage system of claim 9, further including:
  a first magnetic surface operatively engaged with the first transducer; and
  a second magnetic surface operatively engaged with the second transducer.

13. The magnetic storage system of claim 9, further including a correction rate at which the position of the first transducer is adjusted, wherein the correction rate exceeds a rate at which the first transducer encounters embedded servo sectors.

14. The magnetic storage system of claim 9, wherein:
  each rotating disk has two magnetic surfaces;
  a plurality of tracks are on both magnetic surfaces for each rotating disk;
  the plurality of tracks are grouped to form a plurality of zones; and
  each zone is paired with a corresponding zone on another magnetic surface.

15. The magnetic storage system of claim 14, wherein each zone is paired by comparing a geometry of a first zone matching track on a first magnetic surface with a geometry of a second zone matching track on a second magnetic surface, wherein the first zone matching track and the second zone matching track are generally located at a same radial distance from a center of the rotating disk.

16. A magnetic storage system having one or more rotating disks, comprising:
  a first track and a second track, the first track having a first data region and the second track having a second data region, the second data region having a magnetic center;
  a first transducer; and
  a second transducer suspended above the second track which determines a position for the second transducer relative to the magnetic center of the second track in response to only the second data region;
  wherein the first transducer is positioned relative to the first track based upon analysis of the position of the second transducer with respect to the magnetic center of the second track, and the first transducer is positioned at a correction rate that exceeds a rate at which the first transducer encounters embedded servo sectors on the first track.

17. The magnetic storage system of claim 16, wherein the first transducer is positioned relative to the first track as it writes to the first data region based upon the analysis of the position of the second transducer with respect to the magnetic center of the second track.

18. The magnetic storage system of claim 16, further including:
  a first magnetic surface operatively engaged with the first transducer; and
  a second magnetic surface operatively engaged with the second transducer.

19. The magnetic storage system of claim 16, wherein the second transducer includes multiple offset read elements.

20. The magnetic storage system of claim 16, wherein the correction rate is a uniform pulse rate.

21. The magnetic storage system of claim 16, wherein:
  each rotating disk has two magnetic surfaces;
  a plurality of tracks are on both magnetic surfaces for each rotating disk;
  the plurality of tracks are grouped to form a plurality of zones; and
  each zone is paired with a corresponding zone on another magnetic surface.

22. The magnetic storage system of claim 16, wherein the magnetic center of the second track corresponds to a portion of the data region with a strongest magnetic signal.

23. A magnetic storage system having one or more rotating disks, comprising:
  a first track and a second track, the first track having a first data region and the second track having a second data region, the second data region having a magnetic center;
  a first transducer;
  a second transducer suspended above the second track which determines a position for the second transducer relative to the magnetic center of the second track in response to only the second data region; and
  a memory that stores a pairing of the first and second tracks in a look-up table;
  wherein the first transducer is positioned relative to the first track based upon analysis of the position of the second transducer with respect to the magnetic center of the second track, each rotating disk has two magnetic surfaces, a plurality of tracks are grouped to form a plurality of zones, each zone is paired with a corresponding zone on another magnetic surface, each zone is paired by comparing a geometry of a first zone matching track on a first magnetic surface with a geometry of a second zone matching track on a second magnetic surface, and the first zone matching track on the first magnetic surface and the second zone matching track on the second magnetic surface are generally located at a same radial distance from a center of the rotating disk.

24. A method for positioning two or more transducers within a magnetic storage disk drive, comprising the steps of:
  providing one or more disks, wherein each disk has two magnetic surfaces;
  providing one or more tracks for each surface of each disk, wherein each track includes a data region;
  grouping the plurality of tracks on each magnetic surface into a plurality of zones;
  comparing a geometry of a first zone matching track within a first zone on the first magnetic surface to a geometry of a second zone matching track within a second zone on the second magnetic surface;
  pairing a first transducer which writes to a first track on a first surface to a second transducer which reads from a second track on a second surface;
  storing a pairing of the first and second tracks in a look-up table; and positioning the first transducer, as it writes to the data region of the first track, based upon positioning information determined by the second transducer, as it reads from the data region of the second track without reading from any other track on the second surface.

25. The method for positioning two or more transducers of claim 24, further comprising a step of determining which two magnetic surfaces have most similar track geometries within the corresponding zone.

26. The method for positioning two or more transducers of claim 25, wherein the determining step resolves a pairing for the first transducer to the second transducer in the pairing step.

27. The method for positioning two or more transducers of claim 24, wherein the second transducer includes multiple read elements that are both laterally and longitudinally offset from one another.

28. A method for positioning two or more transducers within a magnetic storage disk drive, comprising the steps of:
providing one or more disks, wherein each disk has two magnetic surfaces;
providing one or more tracks for each surface of each disk, wherein each track includes a data region;
pairing a first transducer which writes to a first track on a first surface to a second transducer which reads from a second track on a second surface; and
positioning the first transducer, as it writes to the data region of the first track, based upon positioning information determined by the second transducer, as it reads from the data region of the second track using a read element that the second transducer uses during normal read operations and without reading from any other track on the second surface.

29. A method for positioning two or more transducers within a magnetic storage disk drive, comprising the steps of:
providing one or more disks, wherein each disk has two magnetic surfaces;
providing one or more tracks for each surface of each disk, wherein each track includes a data region;
pairing a first transducer which writes to a first track on a first surface to a second transducer which reads from a second track on a second surface; and
positioning the first transducer, as it writes to the data region of the first track, based upon positioning information determined by the second transducer, as it reads from the data region of the second track without reading from any other track on the second surface, wherein the first track and the second track are located at a same radial distance from a center of the one or more disks.

30. A magnetic storage device, comprising:
a magnetic media;
a first transducer for reading information from the magnetic media;
a second transducer; and
a circuit that adjusts a position of the first transducer at a correction rate that exceeds a rate at which the first transducer encounters embedded servo sectors on the magnetic media in response to user data read by the second transducer.

31. The magnetic storage device of claim 30, wherein the circuit adjusts the position of the first transducer at least three times while the first transducer is between adjacent ones of the embedded servo sectors on the magnetic media.

32. The magnetic storage device of claim 31, wherein the second transducer encounters second embedded servo sectors on a second magnetic media at the same rate that the first transducer encounters the embedded servo sectors on the magnetic media.

33. The magnetic storage device of claim 30, wherein the user data read by the second transducer is located in a data region on a single track on the second magnetic media.

34. The magnetic storage device of claim 30, wherein the correction rate is responsive to a read signal based on first and second analog read signals obtained from first and second laterally and longitudinally offset read elements, respectively, in the second transducer.

35. A magnetic storage device, comprising:
a first transducer that writes to a first data region on a first magnetic media, wherein the first data region is between first embedded servo sectors on the first magnetic media;
a second transducer that reads from a second data region on a second magnetic media to provide a read signal, wherein the second data region is between second embedded servo sectors on the second magnetic media; and
a circuit that positions the first transducer in response to the read signal while the first transducer writes to the first data region.

36. The magnetic storage device of claim 35, wherein the first and second magnetic media are located on opposing surfaces of a single disk.

37. The magnetic storage device of claim 35, wherein the circuit positions the first transducer multiple times while the first transducer continuously writes to the first data region.

38. The magnetic storage device of claim 37, wherein the second transducer reads from only the second data region to provide the read signal, and the second data region is only on a single track on the second magnetic media.

39. The magnetic storage device of claim 38, wherein the circuit simultaneously positions the first and second transducers in response to the read signal while the first transducer writes to the first data region.

40. A disk drive, comprising:
first and second disk surfaces, wherein the first disk surface includes a first track with first embedded servo sectors and first data regions, and the second disk surface includes a second track with second embedded servo sectors and second data regions;
a first transducer for reading from and writing to the first track;
a second transducer for reading from and writing to the second track, wherein the second transducer includes:
a first read element that provides a first read signal in response to information on the second track; and
a second read element that provides a second read signal in response to the information on the second track, wherein the first and second read elements are both laterally and longitudinally offset from each other; and
a circuit that compares the first and second read signals, adjusts the first and second read signals in response to the comparison, provides a combined read signal in response to the adjusted first and second read signals, and positions the first transducer in response to the combined read signal.

41. The disk drive of claim 40, wherein the circuit positions the first transducer as the first transducer writes to one of the first data regions.

42. The disk drive of claim 40, wherein the circuit positions the first transducer multiple times as the first transducer writes to one of the first data regions without encountering any of the first embedded servo sectors.

43. The disk drive of claim 40, wherein the circuit simultaneously positions the first and second transducers in response to the combined read signal.

44. The disk drive of claim 40, wherein the first and second read elements include magnetoresistive material.

45. The disk drive of claim 40, wherein the first and second read elements overlap laterally but do not overlap longitudinally.

46. The disk drive of claim 40, wherein the first and second read elements have identical dimensions.

47. The disk drive of claim 40, wherein the first and second read elements are located on an air bearing surface of a slider.

48. The disk drive of claim 40, further including means for positioning the first and second transducers in response to the first and second read signals.

49. The disk drive of claim 40, wherein the second transducer includes a third read element that provides a third read signal in response to the information on the second track, and the circuit provides the combined read signal in response to the first, second and third read signals.

50. The disk drive of claim 40, wherein the circuit adjusts the first and second read signals in response to detected lateral positions of the first and second read elements with respect to a magnetic center of the second track.

51. The disk drive of claim 50, wherein the circuit adjusts the first and second read signals by changing respective gains of the first and second read signals.

52. The disk drive of claim 50, wherein a transducer center is defined as a center of a sum of a lateral distance covered by the first and second read elements, a majority of the first read element and a minority of the second read element are on a first side of the transducer center, and a majority of the second read element and a minority of the first read element are on a second side of the transducer center opposite the first side.

53. The disk drive of claim 52, wherein the circuit increases a gain of the first read signal when the magnetic center is on the first side of the transducer center.

54. The disk drive of claim 53, wherein the circuit increases a gain of the second read signal when the magnetic center is on the second side of the transducer center.

55. The disk drive of claim 54, wherein the circuit decreases a gain of the first read signal when the magnetic center is on the second side of the transducer center.

56. The disk drive of claim 55, wherein the circuit decreases a gain of the second read signal when the magnetic center is on the first side of the transducer center.

57. The disk drive of claim 52, wherein the circuit increases a gain of the first read signal when the magnetic center is on the first side of the transducer center, and the circuit decreases a gain of the first read signal when the magnetic center is on the second side of the transducer center.

58. The disk drive of claim 57, wherein the circuit increases a gain of the second read signal when the magnetic center is on the second side of the transducer center, and the circuit decreases a gain of the second read signal when the magnetic center is on the first side of the transducer center.

59. The disk drive of claim 58, wherein the circuit combines the gain-adjusted first and second read signals to provide the combined read signal which is processed by a read channel in the disk drive.

60. A disk drive, comprising:

a first disk surface for storing data;

a second disk surface for storing data, wherein the first disk surface is separated from and substantially parallel to the second disk surface, and the first and second disk surfaces have substantially the same radius and, during operation, rotate about a common axis;

a first transducer for transferring data between the first disk surface and an exterior environment;

a second transducer for transferring data between the second disk surface and the exterior environment;

a multi-stage actuator for positioning the first and second transducers at desired locations over the first and second disk surfaces, wherein the multi-stage actuator includes a primary actuator for simultaneously moving the first and second transducers, a first microactuator for moving the first transducer without moving the second transducer, and a second microactuator for moving the second transducer without moving the first transducer; and a circuit that positions the first transducer while the first transducer writes to the first disk surface in response to a read signal that the second transducer provides as the second transducer reads user data from the second disk surface, wherein the circuit positions the first transducer but not the second transducer in response to the read signal.

61. The disk drive of claim 60, wherein the circuit positions the first transducer multiple times while the first transducer continuously writes to a data region on the first disk surface between embedded servo sectors on the first disk surface.

62. The disk drive of claim 60, wherein the read signal is obtained from a single track on the second disk surface.

63. The disk drive of claim 60, wherein the first and second disk surfaces are opposing surfaces of a single magnetic disk.

64. A disk drive, comprising:

a first disk surface for storing data;

a second disk surface for storing data, wherein the first disk surface is separated from and substantially parallel to the second disk surface, and the first and second disk surfaces have substantially the same radius and, during operation, rotate about a common axis;

a first transducer for transferring data between the first disk surface and an exterior environment;

a second transducer for transferring data between the second disk surface and the exterior environment;

a multi-stage actuator for positioning the first and second transducers at desired locations over the first and second disk surfaces, wherein the multi-stage actuator includes a primary actuator for simultaneously moving the first and second transducers, a first microactuator for moving the first transducer without moving the second transducer, and a second microactuator for moving the second transducer without moving the first transducer; and a circuit that positions the first transducer while the first transducer writes to the first disk surface in response to a read signal that the second transducer provides as the second transducer reads user data from the second disk surface, wherein the circuit positions the first transducer multiple times while the first transducer continuously writes to a data region on the first disk surface between embedded servo sectors on the first disk surface.

65. A method of positioning a transducer in a disk drive, comprising:
providing a first transducer for writing to a first disk surface;
providing a second transducer for reading from a second disk surface; and
positioning the first transducer as it writes to a first data region between first embedded servo regions on a first track on the first disk surface in response to a read signal provided by the second transducer as it reads from a second data region between second embedded servo sectors on a second track on the second disk surface.

66. The method of claim 65, including:
comparing geometries of the first and second tracks; and
selecting the second track in response to the comparing step.

67. The method of claim 66, wherein the comparing step is performed during manufacture of the disk drive.

68. The method of claim 66, wherein the comparing step is performed periodically after manufacture of the disk drive.

69. The method of claim 66, including:
storing an association between the first and second tracks in a look-up table in response to the comparing step;
determining that the first transducer shall be writing to the first track;
accessing the look-up table in response to the determining step; and
performing the selecting step in response to the accessing step.

70. A method of positioning a transducer in a disk drive, comprising:
providing a first transducer for reading and writing to and from a first disk surface that includes first and second zones of tracks;
providing a second transducer for reading and writing to and from a second disk surface that includes first and second zones of tracks;
providing a third transducer for reading and writing to and from a third disk surface that includes first and second zones of tracks;
positioning the first transducer as it writes to a track in the first zone on the first disk surface in response to a read signal provided by the second transducer as it reads from a track on the first zone on the second disk surface using a read element that the second transducer uses during normal read operations from the second disk surface and without reading from any other track on the second disk surface; and
positioning the first transducer as it writes to a track in the second zone on the first disk surface in response to a read signal provided by the third transducer as it reads from the second zone on the third disk surface using a read element that the third transducer uses during normal read operations from the third disk surface and without reading from any other track on the third disk surface.

71. The method of claim 70, wherein the first zones on the first, second and third disk surfaces are radially aligned with one another, and the second zones on the first, second and third disk surfaces are radially aligned with one another.

72. A method of positioning a transducer in a disk drive, comprising:
providing a first transducer for reading and writing to and from a first disk surface that includes first and second zones of tracks;
providing a second transducer for reading and writing to and from a second disk surface that includes first and second zones of tracks;
providing a third transducer for reading and writing to and from a third disk surface that includes first and second zones of tracks;
comparing geometries of tracks in the first zones on the first, second and third disk surfaces and selecting the first zone on the second disk surface to provide positioning information for the first zone on the first disk surface in response thereto;
comparing geometries of tracks in the second zones on the first, second and third disk surfaces and selecting the second zone on the third disk surface to provide positioning information for the second zone on the first disk surface in response thereto;
positioning the first transducer as it writes to a track in the first zone on the first disk surface in response to a read signal provided by the second transducer as it reads from a track on the first zone on the second disk surface; and
positioning the first transducer as it writes to a track in the second zone on the first disk surface in response to a read signal provided by the third transducer as it reads from the second zone on the third disk surface;
wherein the comparing steps are performed during manufacture of the disk drive.

73. A method of positioning a transducer in a disk drive, comprising:
providing a first transducer for reading and writing to and from a first disk surface that includes first and second zones of tracks;
providing a second transducer for reading and writing to and from a second disk surface that includes first and second zones of tracks;
providing a third transducer for reading and writing to and from a third disk surface that includes first and second zones of tracks;
comparing geometries of tracks in the first zones on the first, second and third disk surfaces and selecting the first zone on the second disk surface to provide positioning information for the first zone on the first disk surface in response thereto;
comparing geometries of tracks in the second zones on the first, second and third disk surfaces and selecting the second zone on the third disk surface to provide positioning information for the second zone on the first disk surface in response thereto;
positioning the first transducer as it writes to a track in the first zone on the first disk surface in response to a read signal provided by the second transducer as it reads from a track on the first zone on the second disk surface; and
positioning the first transducer as it writes to a track in the second zone on the first disk surface in response to a read signal provided by the third transducer as it reads from the second zone on the third disk surface;
wherein the comparing steps are performed periodically after manufacture of the disk drive.

74. A method of positioning a transducer in a disk drive, comprising:
providing a first transducer for reading from and writing to first tracks on a first disk surface, wherein the first tracks each contain servo sectors interspersed between data regions;

providing a second transducer for reading from and writing to second tracks on a second disk surface, wherein the second tracks each contain servo sectors interspersed between data regions; and a positioning the first transducer multiple times as it writes to one of the data regions on one of the first tracks in response to multiple periodic correction signals responsive to the second transducer as it reads from one of the data regions on one of the second tracks without reading from any other tracks in the disk drive.

75. The method of claim 74, including positioning the first and second transducers simultaneously in response to the correction signals.

76. The method of claim 74, including positioning the first transducer without positioning the second transducer in response to the correction signals using a multi-stage actuator that includes first and second microactuators associated with the first and second transducers, respectively.

77. The method of claim 74, including providing the second transducer with first and second read elements that are both laterally and longitudinally offset from one another and providing the correction signals in response to first and second gain-adjusted read signals in response to the first and second read elements in response to the one of the data regions on the one of the second tracks.

78. The method of claim 74, including selecting the second transducer to provide the correction signals in response to a look-up table.

79. A magnetic storage system having one or more rotating disks, comprising:

a first track and a second track, each including:

a data region, and
one or more embedded servo sectors;

a first transducer suspended over the first track; and a second transducer suspended over the second track, wherein:

the second transducer determines an off-track position with respect to the second track by analyzing the data region of the second track, and the position of the first transducer with respect to the first track is adjusted based upon the off-track position determined by the second transducer at a correction rate that exceeds a rate at which the first transducer encounters embedded servo sectors.

80. A magnetic storage system having one or more rotating disks, comprising:

a first track and a second track, the first track having a first data region and the second track having a second data region, the second data region having a magnetic center;

a first transducer; and a second transducer suspended above the second track which determines a position for the second transducer relative to the magnetic center of the second track in response to user data on the second track;

wherein a position for the first transducer is adjusted at a correction rate that exceeds a rate at which the first transducer encounters embedded servo sectors on the first track in response to the user data.

* * * * *